United States Patent Office

3,827,948
Patented Aug. 6, 1974

3,827,948
METHOD FOR DETECTING CANCER
TISSUE BY POLAROGRAPH
Shun-ichi Hata, Yokohama, Japan, assignor to Chugai
Seiyaku Kabushiki Kaisha, Tokyo, Japan
Filed July 9, 1973, Ser. No. 377,437
Claims priority, application Japan, July 27, 1972,
47/74,635
Int. Cl. G01n 27/48
U.S. Cl. 204—1 T
10 Claims

ABSTRACT OF THE DISCLOSURE

A method for detecting a cancer tissue by measuring a polarographic wave in the range of from $-1.0$ to $-2.0$ v. vs. S.C.E. on an extract of a suspected tissue at a pH value of from 5 to 7 in the presence of an alkali metal halide to determine the presence of a polarographic wave at around $-1.90$ to $-1.95$ v. vs. S.C.E. which is a characteristic of the cancer tissue is disclosed.

BACKGROUND OF THE INVENTION (1) Field of the Invention

This invention relates to a method for detecting a cancer tissue and, more particularly, the present invention relates to a reliable method for detecting a cancer tissue which permits rapid, easy and accurate detection of cancer tissues in the suspected tissue comprising measuring a polarographic wave on the extract of slices of the suspected tissue at a pH value of 5 to 7 in the presence of an alkali metal halide.

(2) Description of the Prior Art

Hithertofore, the histodiagnosis of tumor tissues and normal tissues has been considered to be one of the important detection methods commonly employed in connection with surgical operation, biological assay and other pathological investigations, but the well-known methods are not so advantageous since they require a long period of time. For example, a typical well-known method for detecting the cancer tissue comprises dipping a suspected tissue in formalin, etc. for about 24 hours followed by staining and observing the degree of staining after 4 to 7 days to determine pathological condition.

SUMMARY OF THE INVENTION

As a result of extensive researches on the methods for detecting a cancer tissue to eliminate the disadvantages associated by the known methods, it was found that an extract of the cancer tissue exhibits a characteristic polarographic wave at around $-1.90$ to $-1.95$ v. vs. S.C.E. (saturated calomel electrode) at a pH value of from 5 to 7 in the presence of an alkali metal halide.

BRIEF DESCRIPTION OF THE ACCOMPANYING DRAWINGS

Figure 1:
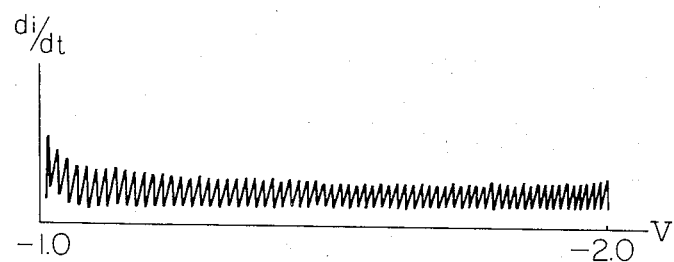
Figure 2:
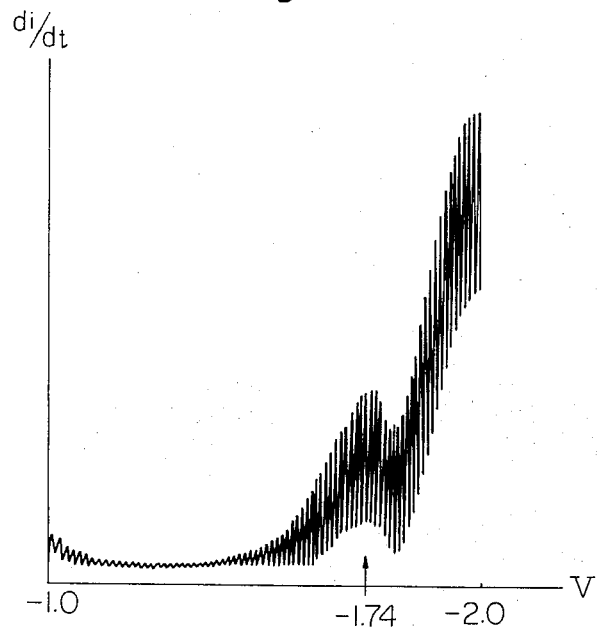
Figure 3:
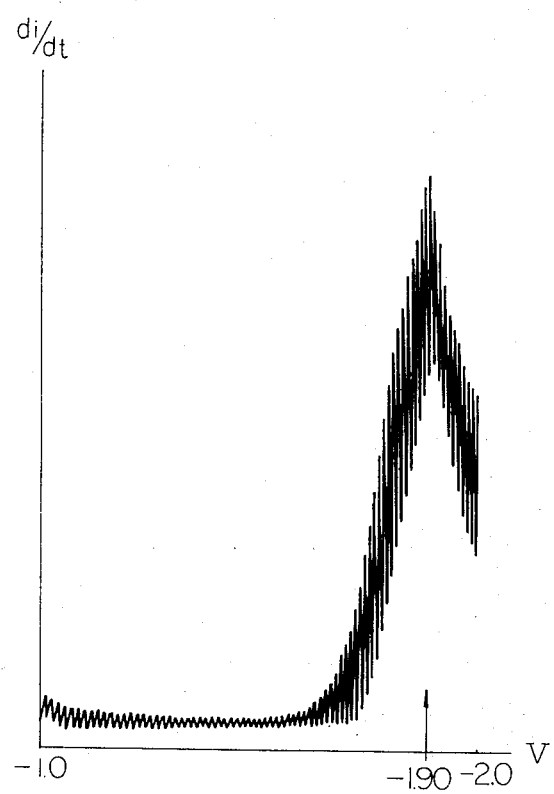

FIGS. 1, 2 and 3 are polarograms obtained by measurement of a phosphate buffer solution, a normal liver tissue of mice and a cancer tissue of the liver, respectively, in accordance with the method of this invention.

DETAILED DESCRIPTION OF THE INVENTION

In accordance with the method of this invention, a slice of the suspected tissue is extracted with an aqueous medium, e.g. water, an aqueous salt solution and a buffer solution in a volume of from 1 to 10 times the volume of the tissue and the polarographic wave is measured on the resulting extract in the range of from $-1.0$ to $-2.0$ v. vs. S.C.E. at a pH value of from 5 to 7 in the presence of an alkali metal halide at a concentration of from 1 to $10^{-5}$ mol/l. to determine the presence of a polarographic wave at around $-1.90$ to $-1.95$ v. vs. S.C.E. which is a characteristic of the cancer tissue.

In carrying out the preferred embodiment of the method of this invention, a suspected tissue is first washed with a cooled physiological saline solution and the washed tissue is cut into pieces using, for example, a pair of scissors. To the resulting tissue pieces is added an aqueous medium having a pH value of from 5 to 7 containing alkali metal halide in a volume of from 1 to 10 times, preferably 2.5 to 5 times the volume of the tissue pieces and the mixture is homogenized for several minutes. The homogenate thus obtained is served as a test solution for measurement of the polarographic wave as it is or after removing debris by the centrifugation. Alternatively, the extraction may be effected with an aqueous medium without the addition of alkali metal halide and/or pH adjustment but in that case both these two steps must be done depending upon the requirement before the measurement of polarographic wave.

The measurement of the polarographic wave can be conducted in the well-known manner using the above obtained test solution in an electrode cell conventionally used for the measurement in the polarograph.

The aqueous medium may be water or any one conventionally used in the biochemical experiment if its solvent is water, for example a physiologically acceptable aqueous salt solution and a buffer solution. A typical example of the biologically accepted aqueous salt solution, it may be any one having a buffer capacity at a pH value between 5 and 7, since its type does not have any influence in general on the results of the measurement of cancer tissues. Suitable examples of the buffer solution include a disodium hydrogen phosphate-potassium dihydrogen phosphate buffer solution, an acetic acid-sodium acetate buffer solution, a tris(hydroxymethyl)aminomethane-hydrochloric acid buffer solution and the like. The concentration of the buger solution is not critical and may be a concentration commonly employed in buffering or higher.

The alkali metal halide which can be used in the present invention includes a halide (fluoride, chloride, bromide, or iodide) of an alkali metal, for example, sodium chloride, potassium chloride, sodium bromide, potassium bromide, sodium iodide, potassium iodide, sodium fluoride, potassium fluoride and the like. The concentration of the alkali metal halide is in the range of from 1 to $10^{-5}$ mol/l., preferably $10^{-1}$ to $10^{-3}$ mol/l.

The present invention is further illustrated by the following example which is not to be construed as limiting the scope of this invention.

EXAMPLE 1

(1) Preparation of Test Tissues (a) The transplanted cancers in mice were induced by the subcutaneous or intraperitoneal administration of abdominal ascites containing corresponding cancer cells to mice (Swiss, weighing 18–23 g.; and C3H, weighing 18–23 g.), respectively, and the proliferated cancer tissues were enucleated after 2–18 days.

(b) The liver cancer in rats was induced by administering Batter Yellow DAB to rats (Wister, weighing 200–220 g.) in the usual manner to obtain the tissue of the DAB induced liver cancer.

(c) The cancer in chickens was induced by transplanting Rous sarcoma cancer cells in chickens (White Leghorn) and the resulting cancer tissues were enucleated after 2 weeks.

(d) As to the cancers in human, the tissues of the liver cancer and the hysteromyoma were used as the test samples.

(e) Normal tissues corresponding to each of the cancer tissues in (a), (b), (c) and (d) were used as control tissues.

(2) Measurement

A 2 g. piece of the test tissue having a size of approximately 1 x 2 x 1 cm. was washed with cooled physiological saline solution and the washed tissue was cut into pieces using a pair of scissors. A phosphate buffer solution of $\frac{1}{15}$ mol/l. (pH 6.8) in a volume of 2.5 to 5 times the volume of the tissue was added to the tissues, and the mixture was homogenized for 3 minutes.

The above buffer solution contained NaCl in an amount of $8.54 \times 10^{-2}$ mol/l. The resulting homogenate *per se* or a supernatant obtained by subjecting the above homogenate to centrifugation of 12,000 G for a period of 5 minutes was then placed in an electrode cell for the measurement of the derivative polarograph. The derivative polarogram was recorded in the range $-1.0$ to $-2.0$ v. using S.C.E. as a control. In measuring the polarograph, it is not necessary to replace the oxygen gas contained in the cell by nitrogen gas. The measurement was conducted at a temperature of from 20 to 22° C.

(3) Results

The results obtained by measurements on mice (Swiss) are shown in FIGS. 1 to 3. The graphs were drawn in the derivative polarograph, and variations of the electric current relative to the potential ($di/dt$) are indicated in the ordinate and the voltage applied (v.) is indicated in the abscissa. FIG. 1 is a graph obtained by measurement of phosphate buffer solution containing sodium chloride and does not show any characteristic signals. FIG. 2 is a graph obtained by measurement of an extract of the normal liver tissue of mice (Swiss) and shows a weak signal at around $-1.74$ v. FIG. 3 is a graph obtained by measurement of an extract of the cancer tissue of liver (Sarcoma-180) of mice (Swiss) and shows a characteristic signal at around $-1.90$ v. From the above results, the cancer tissue can easily be detected and is distinguishable from the normal tissue.

The results obtained by measurements on various test samples in the same manner as above are shown in Table 1 below. As is apparent from the results, the extract from the cancer tissue shows a characteristic derivative polarographic wave at around $-1.90$ to $-1.95$ v. regardless of species of the animal from which the cancer tissue is obtained and origin of the cancer. On the contrary, the extract from the normal animal and the extract from the normal tissue of cancer-bearing animals do not show such a characteristic wave. Also, in tumors of human, two cases of the liver cancer and one case of the lung cancer exhibit a characteristic peak at around $-1.90$ to $-1.95$ v., whereas the extract from the normal tissue or the extract from the tissue of hysteromyoma, a benign tumor, do not show any polarographic wave at around $-1.90$ to $-1.95$ v.

TABLE 1

| Host | Cancer | S.C.E. relative to v. | Test tissue [1] |
|---|---|---|---|
| Mice (Swiss) | Sarcoma (A), (Sarcoma-180). | $-1.92 \pm 0.01$ | 5/5 |
| Do | Krebs (A), (Krebs-2) | $-1.92 \pm 0.02$ | 5/5 |
| Mice (C3H) | Mammary cancer | $-1.92 \pm 0.01$ | 4/4 |
| Mice (Swiss) | Sarcoma (B), (Sarcoma-180); | $-1.95 \pm 0.01$ | 3/3 |
| Do | Krebs (B), (Krebs-2) | $-1.93 \pm 0.02$ | 3/3 |
| Rats (Wister) | DAB induced liver cancer. | $-1.93 \pm 0.03$ | 5/5 |
| Chickens (White Leghorn). | Rous Sarcoma | $-1.90 \pm 0.01$ | 4/4 |
| Human (female) | Liver cancer | $-1.90$ | 1/1 |
| Human (male) | do | $-1.93$ | 1/1 |
| Human (female) | Lung cancer | $-1.88$ | 1/1 |

[1] The value in the denominator indicates the number of measurements and the value in the numerator indicates the number of test tissues which showed a derivative polarographic wave at around $-1.90$ v.: (A)=subcutaneous solid cancer; (B)=intraperitonal ascites cancer; (C)=metastatic cancer.

EXAMPLE 2

A 2 g. piece of the test tissue obtained in the same manner as the Example 1 having a size of approximately 1 x 2 x 1 cm. was washed with cooled physiological saline solution and the washed tissue was cut into pieces using a pair of scissors. A physiological saline solution in a volume of 2.5 to 5 times the volume of the tissue was added to the tissues, and the mixture was homogenized for 3 minutes.

To the homogenate was added sodium chloride so as to be a concentration of $8.54 \times 10^{-2}$ mol/l. The homogenate *per se* or a supernatant obtained by subjecting the above homogenate to centrifugation at 12,000 G for a period of 5 minutes was then placed in an electrode cell for the measurement of the derivative polarograph. The derivative polarogram was recorded in the range of from $-1.0$ to $-2.0$ v. using S.C.E. as a control at a temperature of from 20 to 22° C.

The results were almost the same as in Example 1.

While the invention has been described with reference to the specific embodiments thereof, it will be understood by those skilled in the art that various changes and modifications thereof can be made therein without departing from the spirit and scope of the invention.

What is claimed is:

1. A method for detecting a cancer tissue which comprises extracting pieces of a suspected tissue with an aqueous medium in a volume of from 1 to 10 times the volume of the tissue, and measuring a polarographic wave in the range of from $-1.0$ to $-2.0$ v. vs. S.C.E. on the resulting extract at a pH value of from 5 to 7 in the presence of an alkali metal halide at a concentration of from 1 to $10^{-5}$ mol/l. to determine the presence of a polarographic wave at around $-1.90$ to $-1.95$ v. vs. S.C.E. which is a characteristic of the cancer tissue.

2. A method according to claim 1 wherein the aqueous medium is an aqueous salt solution.

3. A method according to claim 2 wherein the aqueous salt solution is a physiological saline solution.

4. A method according to claim 1 wherein the aqueous medium is a buffer solution.

5. A method according to claim 4 wherein said buffer solution is selected from the group consisting of a disodium hydrogen phosphate-potassium dihydrogen phosphate buffer solution, an acetic acid-sodium acetate buffer solution and a tris(hydroxymethyl) aminomethane-hydrochloric acid buffer solution.

6. A method according to claim 1 wherein the aqueous medium is used in a volume of from 2.5 to 5 times the volume of said tissue.

7. A method according to claim 1 wherein the concentration of alkali metal halide is from $10^{-1}$ to $10^{-3}$ mol/l.

8. A method according to claim 1 wherein the aqueous medium is water.

9. A method according to claim 1 wherein the extraction is carried out with an aqueous medium having a pH value of from 5 to 7 containing an alkali metal halide at a concentration of from 1 to $10^{-5}$ mol/l.

10. A method for detecting a cancer tissue which comprises extracting pieces of a suspected tissue with a buffer solution having a pH value of from 5 to 7 and containing an alkali metal halide at a concentration of from $10^{-1}$ to $10^{-3}$ mol/l. in a volume of from 2.5 to 5 times the volume of the tissue, and measuring a polarographic wave on the resulting extract in the range of from $-1.0$ to $-2.0$ v. vs. S.C.E. to determine the presence of a polarographic wave at around $-1.90$ to $-1.95$ v. vs. S.C.E. which is a characteristic of the cancer tissue.

References Cited

James J. Lingane: "Electroanalytical Chemistry," pp. 234–266 (1958).

GERALD L. KAPLAN, Primary Examiner

U.S. Cl. X.R.

128—2 E

UNITED STATES PATENT OFFICE
CERTIFICATE OF CORRECTION

Patent No. 3,827,948          Dated August 6, 1974

Inventor(s) Shun-ichi HATA

It is certified that error appears in the above-identified patent and that said Letters Patent are hereby corrected as shown below:

Column 2, line 30, before "it" insert -- is physiological saline solution. In case of using a buffered solution --;

line 38, delete "buger" and insert --buffer--.

Column 3, line 29, delete "(di/dt)" and insert --(di/dV)--;

line 60, after "tissue" in Table 1, insert --1--.

Signed and sealed this 31st day of December 1974.

(SEAL)
Attest:

McCOY M. GIBSON JR.       C. MARSHALL DANN
Attesting Officer          Commissioner of Patents